United States Patent [19]

Johannes

[11] 4,306,672

[45] Dec. 22, 1981

[54] APPARATUS FOR SNAPPING GLASS PLATES ALONG STRAIGHT LINES OF INTERSECTION, RUNNING TRANSVERSELY ACROSS THE GLASS PLATE

[75] Inventor: Paul Johannes, Aubervilliers, France

[73] Assignee: Saint-Gobain Industries, Neuilly-sur-Seine, France

[21] Appl. No.: 147,117

[22] Filed: May 6, 1980

[30] Foreign Application Priority Data

May 7, 1979 [DE] Fed. Rep. of Germany ....... 2918331

[51] Int. Cl.³ ............................................. C03B 33/02
[52] U.S. Cl. ......................................... 225/97; 225/5; 225/96.5; 225/98
[58] Field of Search ...................... 225/5, 96.5, 98, 99, 225/97

[56] References Cited

U.S. PATENT DOCUMENTS

| | | |
|---|---|---|
| 3,141,592 | 7/1964 | Glynn et al. ............................ 225/98 |
| 3,372,847 | 3/1968 | Walters et al. ........................... 225/2 |
| 4,049,167 | 9/1977 | Guissard ......................... 225/96.5 X |
| 4,131,222 | 12/1978 | Hodgkinson ................... 225/96.5 X |

FOREIGN PATENT DOCUMENTS

| | | |
|---|---|---|
| 1226754 | 10/1966 | Fed. Rep. of Germany . |
| 1285688 | 12/1968 | Fed. Rep. of Germany . |
| 1957601 | 6/1970 | Fed. Rep. of Germany . |
| 2518243 | 11/1975 | Fed. Rep. of Germany . |
| 1426936 | 12/1965 | France . |
| 1465518 | 12/1966 | France . |
| 2023302 | 8/1970 | France . |

*Primary Examiner*—Frank T. Yost
*Attorney, Agent, or Firm*—Pennie & Edmonds

[57] ABSTRACT

Automatic cracking apparatus for cracking a glass plate along score lines extending across the plate. The apparatus has a vertically inclined main breaking roller where the top of the lower axial end of the roller is even with a feed conveyor and has an edge breaking roller for engaging an edge of the plate and the top of which lies above the highest point of the main breaking roller.

11 Claims, 4 Drawing Figures

APPARATUS FOR SNAPPING GLASS PLATES ALONG STRAIGHT LINES OF INTERSECTION, RUNNING TRANSVERSELY ACROSS THE GLASS PLATE

TECHNICAL FIELD

The invention relates to an apparatus for the automatic cracking or cutting of a glass plate along score lines which extend transversely across the plate with regard to the direction of travel of the plate through the apparatus.

BACKGROUND OF THE INVENTION

Glass plate cracking apparatus is known which utilizes a continuous breaking roller which is disposed parallel to a carrier roller where the breaking roller applies a bending moment to the plate with the result that the plate cracks or breaks along a score line at the point where the score line passes the breaking roller. Such apparatus is used when a glass plate is to be divided or subdivided into relatively broad strips or panes and where the score lines extend continuously across the width of the plate transversely with regard to the direction of its travel through the apparatus.

If however smaller panes of varying sizes are to be cut from a single large glass plate, and if the glass plate is to be optimally divided so as to have a minimum of wastage, then additional score lines are cut into the plate parallel and adjacent to the continuous score lines and which extend only along a part of a continuous score line. Apparatus as described above is inapplicable for use in automatically forming small panes since breaks in the plate will not be limited to the continuous score lines but will run in an uncontrollable manner in the additional score lines extending parallel to the continuous score lines.

In order to cut large glass plates into smaller panes with a minimum of wastage, the practice has been to manually position the plate into an exact breaking position on a breaking table where the cracking along the additional score lines is accomplished by having a cracking strip positioned below the breaking table contact the plate with a stroke-like movement. This method of breaking involves considerable expenditure of work and time because of the discontinuous method of operation and because of the necessary manual manipulation of the plate on the table.

It is therefore an object of my invention to provide for an automatic cracking apparatus by which large glass plates may be automatically broken along continuous score lines which extend transversely across the plate with regard to the direction of travel of the plate through the apparatus and which may also break the plate along additional score lines which are shorter than the continuous score lines and which are parallel to the continuous score lines.

DISCLOSURE OF THE INVENTION

Broadly an apparatus for the automatic cracking of score lines extending across a glass plate according to my invention comprises a horizontal feed conveyor for feeding a glass plate to a main breaking roller and a discharge conveyor for moving broken-off strips from the apparatus after the plate has been broken into a plurality of strips. A feature of the invention is that the longitudinal axis of the main breaking roller is vertically inclined so that the uppermost generatrix of the surface of the roller at its lower axial end lies substantially at the same level as the feed conveyor. A further feature of the invention includes having an edge breaking roller positioned adjacent the higher axial end of the main breaking roller where the edge breaking roller engages one edge of a glass plate and where the uppermost generatrix of the edge breaking roller lies above the uppermost generatrix of the main breaking roller.

This structure results in more controlled breaking moments being applied to the transversely extending score lines on a glass plate than was able to be achieved with the prior mentioned apparatus. The main inclined breaking roller applies a bending moment to the glass plate which, as of itself, is insufficient to start cracking along a score line. The edge breaking roller engages the edge of the glass plate and creates a sufficient bending moment at the edge of the plate to initiate breaking of the score line at the edge and this break is continued across the plate by bending moments applied by the inclined main breaking roller. The bending moments decrease in the direction towards the opposite end of the plate from the edge roller because of the inclination of the main breaking roller. These decreasing bending moments are sufficient to cause cracking along a continuous score line without, however, the cracking extending into any additional score line which may extend parallel to the continuous score line for a short distance.

The longitudinal axis of the edge breaking roller may be positioned in the same vertical axis as the longitudinal axis of the main breaking roller or it may be positioned behind the main breaking roller with respect to the direction of travel of a plate through the apparatus up to a distance of about 300 mm.

The degree of inclination of the main breaking roller and the vertical positioning of the edge breaking roller depends within certain limits on the thickness of the glass plate that is to be broken. For glass plates of customary thickness, it has been found that the inclination of the inclined main breaking roller should be such that the uppermost generatrix at the higher axial end of the roller should be 2 to 15 mm above the level of the feed conveyor. The uppermost generatrix of the edge breaking roller should be 4 to 20 mm above the level of the feed conveyor.

Preferably when a glass plate having a thickness greater than 6 mm is to be cut, the apparatus includes a pressure roller adapted to engage the top of the glass plate and which is positioned in the direction of travel of the plate through the apparatus behind the edge breaking roller. By use of the pressure roller, the bending moment exerted on the glass plate may be increased. The use of the pressure roller with plates of 6 mm thickness further assures formation of relatively narrow glass panes which are to be separated from a glass plate.

DETAILED DESCRIPTION OF THE PREFERRED EMBODIMENT

Figure 1:
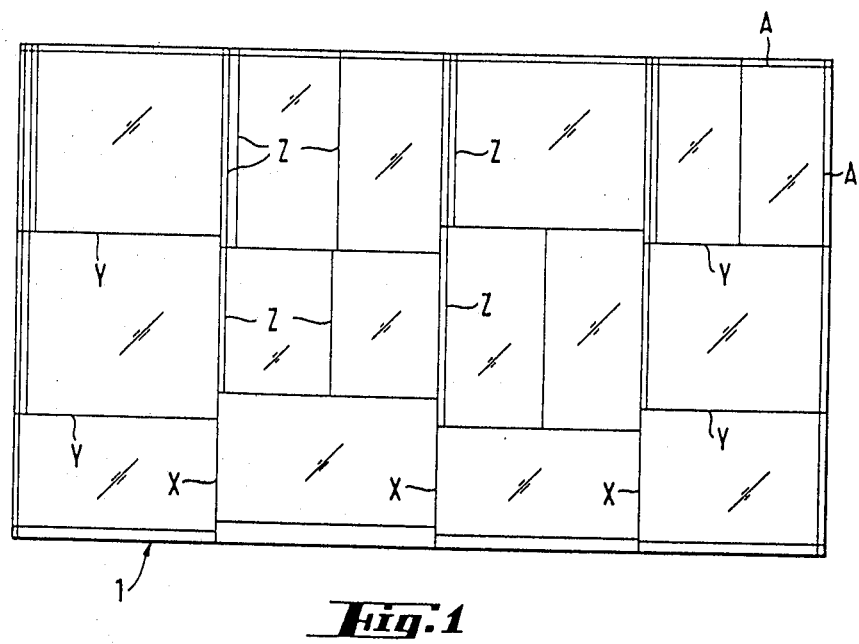
FIG. 1 is a plan view of a large glass plate with score lines applied to the plate.

Referring to FIG. 1, a glass plate 1 is shown having score lines X, Y and Z along which the glass plate is to be cracked in order to form smaller glass panes. Customarily glass plates 1 are delivered by the manufacturer in standard sizes of about 6 m in length by 3 m in width. Basically the division of the large glass plate is accomplished in such a way that it is first subdivided along the continuous score lines X which extend over the entire width of the plate to form so-called "Traveren" strips. These strips are then cracked or snapped in series connected snapping actions along the Y score lines and the Z score lines.

The cutting program for a glass plate is such that an optimum number of glass panes may be formed from a single glass plate with a minimum of wastage. This is accomplished by having the broadest pane to be cut determine the position of an X score line within a strip. Since the other panes within a single strip are normally more narrow than the single strip, additional Z score lines are provided parallel to and spaced close to the X score lines. These Z score lines only extend part-way along an X score line and always terminate at a Y score line. In addition continuous score lines A are drawn parallel to and spaced a short distance from the two edges of the glass plate from which measurements are made. This is to accommodate any irregularities or faults which may exist in the edges of the plate.

Glass plate 1 is then fed to a cutting apparatus in such a manner that the X score lines lie ahead of the Z score lines in the direction of travel of the plate through the apparatus and such that the breaking rollers will initially engage the X score lines.

Figure 2:
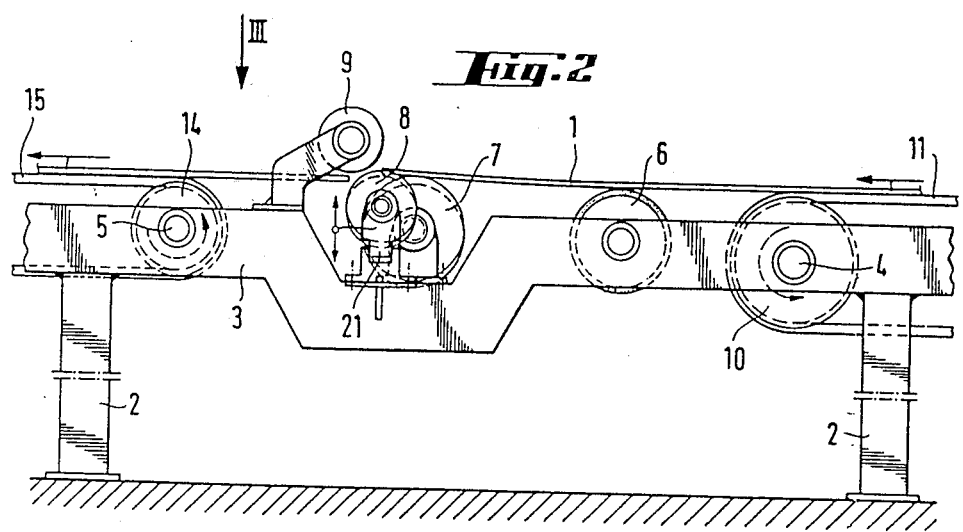
FIG. 2 is a side view of a cracking apparatus constructed according to the invention.
Figure 3:
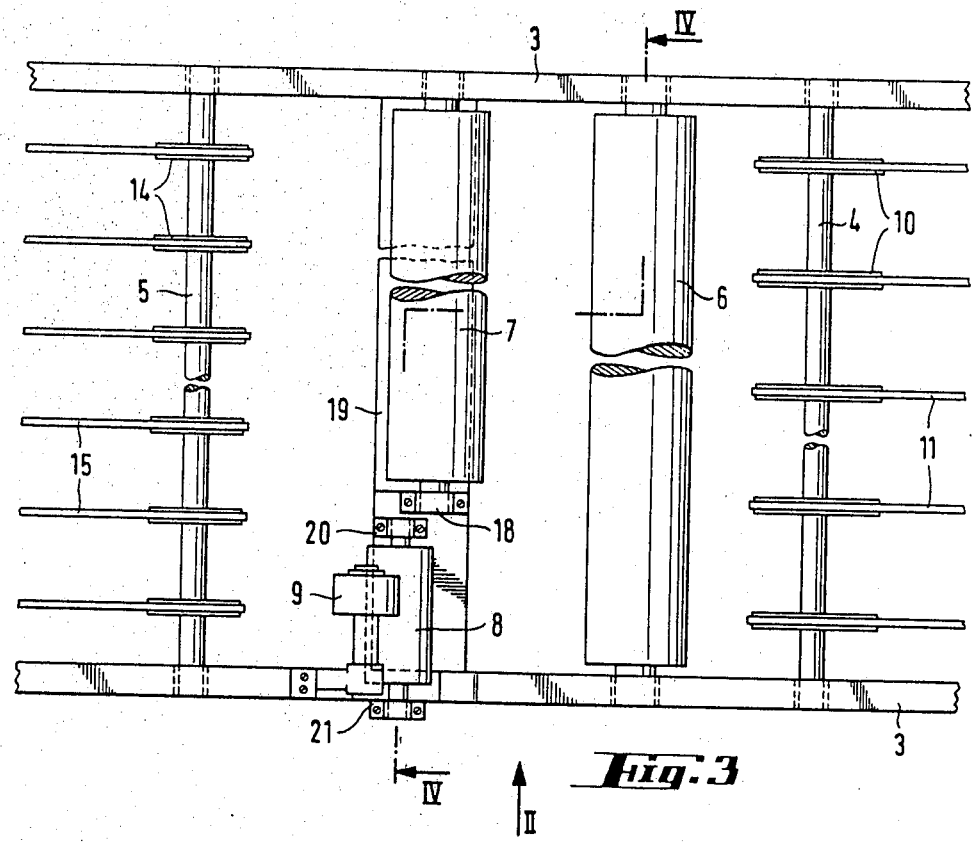
FIG. 3 is a top view of a cracking apparatus of FIG. 2.
Figure 4:
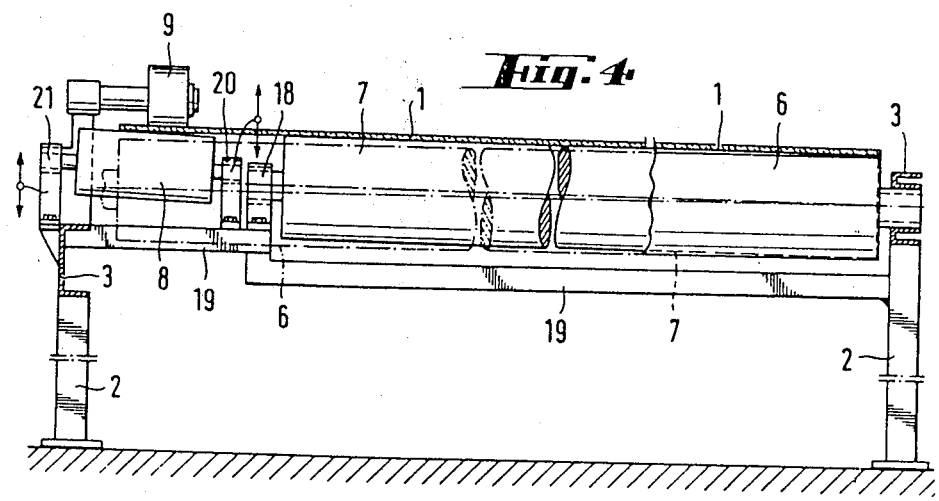
FIG. 4 is a sectional view of the cracking apparatus of FIG. 1 taken along lines 4—4 of FIG. 3.

Referring to FIGS. 2-4, the apparatus constructed according to the invention comprises a frame 3 which is mounted on supports 2. The frame 3 contains bearings for the shafts 4 and 5 and for the shaft mounting a carrier roller 6. The frame also provides a support for a main breaking roller 7, an edge breaking roller 8 and a pressure roller 9. The shaft 4 has a plurality of V-shaped pulleys 10 mounted thereon and over which V-belts 11 extend to comprise a horizontal feed conveyor for feeding glass plates to the main breaking roller 7. The shaft 5 has a plurality of V-belt pulleys 14 mounted thereon over which V-belts 15 run to comprise a discharge conveyor for broken off strips. The discharge conveyor is provided with a drive means which is independent of the drive means for the feed conveyor.

The carrier roller 6, the inclined main breaking roller 7, the edge breaking roller 8 and the pressure roller 9 are all disposed between the feed and discharge conveyors. The uppermost generatrix of the carrier roller 6 lies on the carrying level of the V-belts 11 and this roller 6 is driven synchronously with the carrying belts 11 and the breaking roller 7 such that their peripheral speeds are the same. The carrying roller 6 provides an even support of the glass plate 1.

As shown in FIGS. 2 and 4, the main breaking roller 7 is slightly inclined whereby its uppermost generatrix at its higher axial end adjacent the edge breaking roller 8 is positioned about 5 mm above the carrying level of the carrier roller 6 and the carrier belt 11. The uppermost generatrix of the opposite lower axial end of the main breaking roller 7 is even with the level of the carrier roller 6. The higher axial end of the breaking roller 7 is mounted in a bearing block 18 which in turn is attached to a cross-piece 19 mounted on the frame 3. A bearing block 20 is also mounted on the cross-piece 19 to support one end of the edge breaking roller 8. The opposite end of the edge breaking roller 8 is supported by the bearing block 21 mounted on frame 3.

Both bearing blocks 20 and 21 are vertically adjustable such that the height of the edge breaking roller 8 may be adjusted or the inclination of the breaking roller 8 may be adjusted as shown in FIG. 4. Inclination of the edge breaking roller may be of advantage in producing a precise application of bending moment on the edge of the glass plate in order to initiate start of breaking on an X score line. The height of the breaking roller is set so that its uppermost generatrix lies about 10 mm above the level of the carrier roller 6 such that there is a difference in height of 5 mm between it and the uppermost generatrix of the main breaking roller 7. This variable arrangement in height of roller 6, the main breaking roller 7 and the edge breaking roller 8 is illustrated in FIG. 4.

The pressure roller 9 is inserted behind the breaking roller 8 with respect to the direction of travel of the plate 1 through the apparatus in order to assist in breaking a relatively thick glass plate and where the natural weight of the part of the glass plate projecting behind the main breaking roller 7 is insufficient to initiate a break.

The carrier roller 6 and the main breaking roller 7 preferably are each provided with an elastic material on their outer peripheries in order to provide a cushioning effect. The carrying level of the belts 12 for the discharge conveyor may be on the same level as the carrier belts 11 of the feed conveyor or on a lower level. The speed of the conveyor belts 15 should be greater than the speed of the belts 11 and the peripheral speeds of the rollers 6 and 7 in order to insure separation of broken off strips from the area of the breaking rollers.

I claim:

1. Apparatus for the automatic cracking of score lines extending across a glass plate during travel of a plate through the apparatus with the apparatus comprising a horizontal feed conveyor, a discharge conveyor and a main breaking roller disposed between the feed conveyor and the discharge conveyor with the uppermost generatrix of the surface of the main breaking roller lying above the level of the feed conveyor and the discharge conveyor; the improvement characterized in that the main breaking roller is inclined vertically along its longitudinal axis whereby the uppermost generatrix of the surface of the main breaking roller at its lower axial end lies substantially at the level of the feed conveyor, and in having in addition an edge breaking roller positioned near the upper axial end of the main breaking roller adapted to engage one edge of a glass plate and whereby the uppermost generatrix of the edge breaking roller lies above the uppermost generatrix of the main breaking roller.

2. Apparatus according to claim 1 further characterized in that the edge breaking roller is positioned in the direction of travel of a plate through the apparatus behind the main breaking roller at a horizontal distance of up to approximately 300 mm.

3. Apparatus according to claim 1 further characterized in that the uppermost generatrix of the main breaking roller at its upper axial end extends substantially 2-15 mm above the level of the feed conveyor.

4. Apparatus according to claim 1 further characterized in that the uppermost generatrix of the edge breaking roller lies substantially 4–20 mm above the level of the feed conveyor.

5. Apparatus according to claim 1 further characterized in having a press roller adapted to engage the top of the glass plate and positioned horizontally behind the edge breaking roller in the direction of travel of a glass plate through the apparatus.

6. Apparatus according to claim 1 further characterized in having means for varying the inclination of the main breaking roller.

7. Apparatus according to claim 1 further characterized in that means are provided for varying the height of the edge breaking roller.

8. Apparatus according to claim 1 further characterized in that the edge breaking roller is inclined vertically along its longitudinal axis with the lower axial end extending towards the main breaking roller.

9. Apparatus according to claim 1 further characterized in that said feed conveyor comprises conveyor feed belts and in having in addition a carrier roller positioned in the apparatus ahead of the main breaking roller in the direction of travel of a glass plate through the apparatus adapted to support a glass plate over its entire width.

10. Apparatus according to claim 9 further characterized in that the breaking roller and carrier roller each have an elastically padded jacket thereon extending over their outer peripheries.

11. Apparatus according to claim 9 further characterized in that the conveyor belts of the feed conveyor, the carrier roller and the breaking roller are all synchronously driven.

* * * * *

UNITED STATES PATENT AND TRADEMARK OFFICE
CERTIFICATE OF CORRECTION

PATENT NO. : 4,306,672

DATED : December 22, 1981

INVENTOR(S) : Paul Johannes

It is certified that error appears in the above-identified patent and that said Letters Patent are hereby corrected as shown below:

Title Page, Item 73, Assignee should read ---Saint Gobain Vitrage---.

Signed and Sealed this

Twenty-third Day of March 1982

|SEAL|

Attest:

GERALD J. MOSSINGHOFF

Attesting Officer    Commissioner of Patents and Trademarks